United States Patent
Tamura et al.

(10) Patent No.: US 7,441,095 B2
(45) Date of Patent: Oct. 21, 2008

(54) STORAGE SYSTEM AND STORAGE CONTROLLER

(75) Inventors: Keishi Tamura, Odawara (JP); Shinichi Nakayama, Chigasaki (JP); Katsuhiro Uchiumi, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 214 days.

(21) Appl. No.: 10/769,805

(22) Filed: Feb. 3, 2004

(65) Prior Publication Data

US 2005/0071559 A1    Mar. 31, 2005

(30) Foreign Application Priority Data

Sep. 29, 2003    (JP)    ............... 2003-337239

(51) Int. Cl.
*G06F 12/10*    (2006.01)

(52) U.S. Cl. .............. 711/203; 711/207; 711/114; 711/118; 710/38

(58) Field of Classification Search ............. 711/14, 711/117–118, 202–203, 205–207; 710/38
See application file for complete search history.

(56) References Cited

U.S. PATENT DOCUMENTS

| | | |
|---|---|---|
| 3,771,137 A | 11/1973 | Barner et al. |
| 4,025,904 A | 5/1977 | Adney et al. |
| 4,710,868 A | 12/1987 | Cocke et al. |
| 5,155,845 A | 10/1992 | Beal et al. |
| 5,408,465 A | 4/1995 | Gusella et al. |
| 5,459,857 A | 10/1995 | Ludlam et al. |
| 5,504,882 A | 4/1996 | Chai et al. |
| 5,548,712 A | 8/1996 | Larson et al. ............... 714/7 |
| 5,615,329 A | 3/1997 | Kern et al. |
| 5,680,580 A | 10/1997 | Beardsley et al. |
| 5,680,640 A | 10/1997 | Ofek et al. ............... 710/19 |
| 5,758,118 A | 5/1998 | Choy et al. ............... 711/114 |
| 5,835,954 A | 11/1998 | Duyanovich et al. ........ 711/162 |
| 5,870,537 A | 2/1999 | Kern et al. |
| 5,895,485 A | 4/1999 | Loechel et al. |

(Continued)

FOREIGN PATENT DOCUMENTS

CN    1416062    5/2003

(Continued)

OTHER PUBLICATIONS

"SAN Virtualization Guidelines", DataCore Software Corporation, 2000, pp. 1-9.

(Continued)

*Primary Examiner*—Matt Kim
*Assistant Examiner*—Hetul Patel
(74) *Attorney, Agent, or Firm*—Mattingly, Stanger, Malur & Brundidge, P.C.

(57) ABSTRACT

A first storage controller has a multilayer memory hierarchy constructed by LDEV (logical device) connected from LUN, and VDEV (virtual device) connected to the lower order of the LDEV. At least one of the VDEVs is constructed by mapping the memory resources arranged in external storage controllers. The functions of a stripe, RAID, etc. can be added in the mapping. Various kinds of functions (remote copy, variable volume function, etc.) applicable to the normal internal volume can be also used in a virtual internal volume by using the external memory resource as the virtual internal memory resource so that the degree of freedom of utilization is raised.

7 Claims, 9 Drawing Sheets

U.S. PATENT DOCUMENTS

| | | | |
|---|---|---|---|
| 5,917,723 A | 6/1999 | Binford | |
| 5,937,174 A | 8/1999 | Weber | |
| 5,956,750 A | 9/1999 | Yamamoto et al. | |
| 6,012,123 A | 1/2000 | Pecone et al. | |
| 6,073,209 A | 6/2000 | Bergsten | |
| 6,098,129 A | 8/2000 | Fukuzawa et al. | |
| 6,108,748 A | 8/2000 | Ofek et al. | 711/112 |
| 6,145,028 A | 11/2000 | Shank et al. | |
| 6,173,374 B1 | 1/2001 | Heil et al. | |
| 6,209,059 B1 * | 3/2001 | Ofer et al. | 711/114 |
| 6,216,202 B1 * | 4/2001 | D'Errico | 711/114 |
| 6,219,753 B1 | 4/2001 | Richardson | |
| 6,230,239 B1 | 5/2001 | Sakaki et al. | 711/112 |
| 6,240,486 B1 | 5/2001 | Ofek et al. | 711/112 |
| 6,247,099 B1 | 6/2001 | Skazinski et al. | |
| 6,247,103 B1 | 6/2001 | Kern et al. | |
| RE37,305 E | 7/2001 | Chang et al. | |
| 6,295,578 B1 | 9/2001 | Dimitroff et al. | |
| 6,341,329 B1 | 1/2002 | LeCrone et al. | |
| 6,446,141 B1 | 9/2002 | Nolan et al. | |
| 6,446,175 B1 | 9/2002 | West et al. | |
| 6,457,139 B1 | 9/2002 | D'Errico et al. | 714/5 |
| 6,484,173 B1 | 11/2002 | O'Hare et al. | |
| 6,490,659 B1 | 12/2002 | McKean et al. | |
| 6,523,096 B2 | 2/2003 | Sanada et al. | |
| 6,529,976 B1 | 3/2003 | Fukuzawa et al. | |
| 6,553,408 B1 | 4/2003 | Merrell et al. | |
| 6,557,089 B1 | 4/2003 | Reed et al. | |
| 6,622,220 B2 | 9/2003 | Yoshida et al. | |
| 6,640,278 B1 | 10/2003 | Nolan et al. | |
| 6,640,291 B2 | 10/2003 | Fujibayashi et al. | 711/162 |
| 6,647,387 B1 | 11/2003 | McKean et al. | |
| 6,647,474 B2 | 11/2003 | Yanai et al. | |
| 6,654,830 B1 | 11/2003 | Taylor et al. | |
| 6,654,831 B1 | 11/2003 | Otterness et al. | |
| 6,675,258 B1 | 1/2004 | Bramhall et al. | |
| 6,681,303 B1 | 1/2004 | Watanabe et al. | |
| 6,681,339 B2 | 1/2004 | McKean et al. | |
| 6,684,310 B1 | 1/2004 | Anzal et al. | |
| 6,684,313 B2 * | 1/2004 | Voigt et al. | 711/170 |
| 6,718,404 B2 | 4/2004 | Reuter et al. | |
| 6,725,289 B1 * | 4/2004 | Waldspurger et al. | 710/9 |
| 6,745,281 B1 | 6/2004 | Saegusa | |
| 6,748,502 B2 | 6/2004 | Watanabe et al. | |
| 6,772,315 B1 | 8/2004 | Perego | |
| 6,799,255 B1 | 9/2004 | Blumenau et al. | |
| 6,816,948 B2 | 11/2004 | Kitamura et al. | 711/152 |
| 6,826,778 B2 | 11/2004 | Bopardikar et al. | 725/145 |
| 6,851,020 B2 | 2/2005 | Matsumoto et al. | |
| 6,857,057 B2 | 2/2005 | Nelson et al. | |
| 6,883,064 B2 | 4/2005 | Yoshida et al. | |
| 6,898,670 B2 * | 5/2005 | Nahum | 711/114 |
| 6,973,549 B1 | 12/2005 | Testardi | |
| 6,976,103 B1 | 12/2005 | Watanabe et al. | |
| 6,976,134 B1 * | 12/2005 | Lolayekar et al. | 711/148 |
| 7,051,121 B2 | 5/2006 | Ohno et al. | |
| 2001/0050915 A1 | 12/2001 | O'Hare et al. | |
| 2001/0052018 A1 | 12/2001 | Yokokura | |
| 2001/0054133 A1 | 12/2001 | Murotani et al. | |
| 2002/0003022 A1 | 1/2002 | Csida et al. | |
| 2002/0004857 A1 | 1/2002 | Arakawa et al. | |
| 2002/0019908 A1 | 2/2002 | Reuter et al. | |
| 2002/0019909 A1 | 2/2002 | D'Errico | |
| 2002/0019920 A1 | 2/2002 | Reuter et al. | |
| 2002/0019922 A1 | 2/2002 | Reuter et al. | |
| 2002/0019923 A1 | 2/2002 | Reuter et al. | |
| 2002/0026558 A1 | 2/2002 | Reuter et al. | |
| 2002/0029326 A1 | 3/2002 | Reuter et al. | |
| 2002/0065864 A1 | 5/2002 | Hartsell et al. | |
| 2002/0087544 A1 | 7/2002 | Selkirk et al. | |
| 2002/0103889 A1 | 8/2002 | Markson et al. | |
| 2002/0112113 A1 | 8/2002 | Karpoff et al. | |
| 2002/0124108 A1 | 9/2002 | Terrell et al. | |
| 2002/0133735 A1 | 9/2002 | McKean et al. | |
| 2002/0156887 A1 | 10/2002 | Hashimoto | |
| 2002/0156984 A1 | 10/2002 | Padovano | |
| 2002/0156987 A1 | 10/2002 | Gajjar et al. | |
| 2002/0178335 A1 | 11/2002 | Selkirk et al. | |
| 2002/0188592 A1 | 12/2002 | Leonhardt et al. | |
| 2002/0194523 A1 | 12/2002 | Ulrich et al. | 714/4 |
| 2003/0037071 A1 | 2/2003 | Harris et al. | |
| 2003/0051109 A1 | 3/2003 | Cochran | |
| 2003/0056038 A1 | 3/2003 | Cochran | |
| 2003/0061440 A1 | 3/2003 | Elliott | |
| 2003/0079018 A1 | 4/2003 | Lolayekar et al. | |
| 2003/0079019 A1 | 4/2003 | Lolayekar et al. | |
| 2003/0093541 A1 | 5/2003 | Lolayekar et al. | |
| 2003/0093567 A1 | 5/2003 | Lolayekar et al. | |
| 2003/0097607 A1 | 5/2003 | Bessire | |
| 2003/0101228 A1 | 5/2003 | Busser et al. | |
| 2003/0115218 A1 | 6/2003 | Bobbit et al. | |
| 2003/0115432 A1 | 6/2003 | Biessener et al. | |
| 2003/0126327 A1 | 7/2003 | Pesola et al. | |
| 2003/0140209 A1 | 7/2003 | Testardi | |
| 2003/0145168 A1 | 7/2003 | LeCrone et al. | |
| 2003/0145169 A1 | 7/2003 | Nagasawa et al. | 711/117 |
| 2003/0158999 A1 | 8/2003 | Hauck et al. | |
| 2003/0167419 A1 | 9/2003 | Yanai et al. | |
| 2003/0182525 A1 | 9/2003 | O'Connell et al. | 711/162 |
| 2003/0200387 A1 | 10/2003 | Urabe et al. | |
| 2003/0204597 A1 | 10/2003 | Arakawa et al. | |
| 2003/0204700 A1 | 10/2003 | Biessener et al. | |
| 2003/0212860 A1 | 11/2003 | Jiang et al. | |
| 2003/0221077 A1 | 11/2003 | Ohno et al. | |
| 2003/0229645 A1 | 12/2003 | Nelson et al. | |
| 2004/0003022 A1 | 1/2004 | Garrison et al. | |
| 2004/0028043 A1 | 2/2004 | Maveli et al. | |
| 2004/0049553 A1 | 3/2004 | Iwamura et al. | |
| 2004/0054850 A1 | 3/2004 | Fisk | |
| 2004/0054866 A1 | 3/2004 | Blumenau et al. | |
| 2004/0064610 A1 | 4/2004 | Fukuzawa et al. | |
| 2004/0064641 A1 | 4/2004 | Kodama | |
| 2004/0068637 A1 | 4/2004 | Nelson et al. | |
| 2004/0088417 A1 | 5/2004 | Bober et al. | |
| 2004/0111485 A1 | 6/2004 | Mimatsu et al. | |
| 2004/0123180 A1 | 6/2004 | Soejima et al. | |
| 2004/0139237 A1 | 7/2004 | Pangal et al. | |
| 2004/0143832 A1 | 7/2004 | Yamamoto et al. | |
| 2004/0148443 A1 | 7/2004 | Achiwa et al. | |
| 2004/0172510 A1 | 9/2004 | Nagshima et al. | |
| 2004/0230980 A1 | 11/2004 | Koyama et al. | |
| 2004/0260875 A1 | 12/2004 | Murotani et al. | |
| 2004/0260966 A1 | 12/2004 | Kaiya et al. | |
| 2005/0010734 A1 | 1/2005 | Soejima et al. | 711/163 |
| 2005/0010743 A1 | 1/2005 | Tremblay et al. | |
| 2005/0033878 A1 | 2/2005 | Mogi et al. | |
| 2005/0050271 A1 * | 3/2005 | Honda et al. | 711/114 |
| 2005/0081009 A1 | 4/2005 | Williams et al. | 711/163 |
| 2005/0138184 A1 | 6/2005 | Amir | |
| 2005/0144384 A1 * | 6/2005 | Eguchi et al. | 711/114 |
| 2005/0240741 A1 | 10/2005 | Nagasawa et al. | |

FOREIGN PATENT DOCUMENTS

| | | |
|---|---|---|
| EP | 1130514 | 9/2001 |
| EP | 1 286 272 A2 | 2/2003 |
| EP | 1357476 | 10/2003 |
| JP | 07239799 | 9/1995 |
| JP | 09-288547 | 11/1997 |
| JP | 10283272 | 10/1998 |
| JP | 2000293317 | 10/2000 |
| JP | 2001067187 | 3/2001 |
| JP | 2001-337850 | 12/2001 |
| JP | 2002157091 | 5/2002 |

| | | |
|---|---|---|
| JP | 2002 215334 | 8/2002 |
| JP | 2002230246 | 8/2002 |
| JP | 2002324000 | 11/2002 |
| JP | 2003 513352 | 4/2003 |
| WO | 9709676 | 3/1997 |
| WO | 0029324 | 5/2000 |
| WO | 03023640 | 3/2003 |
| WO | 03027886 | 4/2003 |
| WO | 03030431 | 4/2003 |
| WO | 03030449 | 4/2003 |

OTHER PUBLICATIONS

P. Sarkar, et al "Internet Protocol Storage Area Networks", IBM Systems, Journal, vol. 42, No. 2, 2003, pp. 218-231.

E. Anderson, et al, "Hippodrome: Running Circles Around Storage Adminstration", Hewlett-Packard Laboratories, pp. 14.

JP 10-508967 (PCT equivalent WO 97/09676).

"Sandrad Application Note: Migrating Individual Servers to an iSCSI SAN", APP-004-01, SANDRAD 2003, pp. 1-15.

SANRAD Application Note: Data Migration Solution Transferring Data Between Storage Systems Over Fibre-Channel or SCSI Connections, APP-003-03, SANRAD 2003, pp. 1-9.

"White Paper—Celerra Data Migration Service (CDMS)", EMC Corporation, Jan. 2002, pp. 1-13.

* cited by examiner

| VDEV | EXTERNAL DEVICE INFORMATION | | | | |
|---|---|---|---|---|---|
| | DEVICE IDENTIFICATION INFORMATION | CAPACITY (KB) | DEVICE CLASSIFICATION | PATH INFORMATION | |
| | | | | WWN | LUN |
| 0 | DRFGTFNEIEK | 657,456 | DISK | 0xAABBCCDD | 0 |
| 1 | ADRFGTFNEIE | 89,854 | DISK | 0xAABBEEFF | 3 |
| 2 | GGRRFFDDERT | Ñ | TAPE | 0x445566AAB | 5 |
| 3 | AABBCCDDEE | 5,544223 | DISK | 0x77DE12345 | 6 |
| | | | | 0x77DE12345 | 3 |
| | | | | 0x377DE7890 | 5 |

Tm

ALTERNATION PATH (last three rows of VDEV 3)

| VDEV# | STRIPE SIZE | RAID LEVEL | OTHER COMPANY SS# | VDEV - EXTERNAL LUN PATH | | |
|---|---|---|---|---|---|---|
| | | | | INITIATOR PORT | WWN | LUN |
| 1 | 64BYTE | RAID 1 | 1 | 1 | 0x00112233ANBCD | 0 |
| | | | | 4 | 0x001122334455678 | 0 |
| | | | | 3 | 0x001122337788990 | 4 |
| | | | 4 | 1 | 0x001122334455678 | 1 |
| | | | 6 | 3 | 0x001122337788990 | 2 |
| | | | 7 | 3 | 0x001122334455678 | 5 |

STORAGE SYSTEM AND STORAGE CONTROLLER

CROSS-REFERENCES TO RELATED APPLICATIONS

This application relates to and claims priority from Japanese Patent Application No. 2003-337239 filed on Sep. 29, 2003, the entire disclosure of which is incorporated herein by reference.

BACKGROUND OF THE INVENTION

The present invention relates to a storage system and a storage controller.

For example, in a database system for treating a large amount of data such as a data center, etc., the data are managed by using a storage system constructed separately from a host computer. This storage system is constructed from e.g., a disk array device, etc. The disk array device is constructed by arranging many memory devices in an array shape, and is also constructed on the basis of e.g., RAID (Redundant Array of Independent Inexpensive Disks). At least one or more logical volumes (logical units) are formed in a physical memory area provided by a memory device group. This logical volume is provided to the host computer (more specifically, a database program operated in the host computer). The host computer can write and read data with respect to the logical volume by transmitting a predetermined command.

As the information society is advanced, etc., the data to be managed by the database are daily increased. Therefore, a storage controller of higher performance and larger capacity is required. The storage controller of a new type is developed to satisfy this market request. Two methods for introducing the storage controller of the new type into the storage system are considered. One of these methods is a method for perfectly replacing the storage controller of an old type and the storage controller of the new type and entirely constructing the storage system from the storage controller of the new type (JP-T-10-508967) (the term "JP-T" as used herein means a published Japanese translation of a PCT patent application). The other method is a method for newly adding the storage controller of the new type to the storage system constructed by the storage controller of the old type and making the storage controllers of the new and old types coexist.

A technique for managing the memory area of a physical device in a sector unit and dynamically constructing the logical device in the sector unit is also known (JP-A-2001-337850).

Further, a technique for forming an area in conformity with the memory device of smallest capacity in the construction of the logical device from plural memory devices of different capacities, and forming areas in conformity with the smallest capacity with respect to the remaining capacities is also known (JP-A-9-288547).

When the storage controller is perfectly transferred from the storage controller of the old type to the storage controller of the new type, it is possible to utilize function and performance of the storage controller of the new type. However, no storage controller of the old type can be effectively utilized and introducing cost is increased. When it is intended that the storage controller of the old type and the storage controller of the new type coexist, the number of storage controllers constituting the storage system is increased and it takes much time and labor to manage and operate the storage controllers of both the new and old types.

Further, in a case in which responsibility of the memory device arranged in the storage controller of the old type is low, the performance of the entire system is reduced by connecting this memory device of the old type to the storage system. For example, this case is a case in which the memory device of the old type is a device involving a mechanical operation (head seek, etc.) and mechanical operation time is long and the capacity of a buffer for data transfer arranged in the memory device of the old type is small, etc.

Further, there is also a case in which no memory device of the old type can be utilized as it is as in the combination of an open system memory device and a main frame, or a server able to connect only the memory device having a specific function, etc.

SUMMARY OF THE INVENTION

The present invention is made in consideration of the above problem points, and one object of the present invention is to provide a storage system and a storage controller able to effectively utilize memory resources by connecting different storage controllers such as new and old storage controllers in cooperation with each other.

Another object of the present invention is to provide a storage system and a storage controller able to utilize the memory device of the old type as if the storage controller of the old type is the memory device of the new type.

Another object of the present invention is to provide a storage system and a storage controller able to add a new function while advantages of the memory device of the old type are practically used.

Further objects of the present invention will become apparent from the description of embodiment modes described later.

DESCRIPTION OF THE SPECIFIC EMBODIMENTS

To solve the above problem, the storage system in the present invention is a storage system constructed by communicably connecting a first storage controller and a second storage controller and performing data processing according to a request from a host device, wherein the first storage controller has at least one or more logical units accessed by the host device, and at least one or more intermediate memory hierarchies arranged so as to connect this logical unit and at least one or more memory devices, and at least one of the intermediate memory hierarchies is connected to a memory device arranged in the second storage controller.

Here, for example, a disk array device, a fiber channel switch, etc. can be used as the storage controller. For example, a computer such as a personal computer, a main frame, etc. can be used as the host device. The first storage controller and the second storage controller are connected so as to perform bidirectional communication through a communication network. The first storage controller and the host device are also connected so as to perform the bidirectional communication through the communication network. The second storage controller and the host device can be also connected to each other so as to perform the bidirectional communication. For example, LAN (Local Area Network), SAN (Storage Area Network), a dedicated line, the Internet, etc. can be used as the communication network. For example, reading processing of data, writing processing of data, etc. can be used as the data processing according to the request from the host device. The first storage controller and the second storage controller may be arranged within the same site, and may be also arranged in sites different from each other. Further, when the first storage controller has a memory device, this memory device is also connected to the logical unit through the intermediate memory hierarchy.

The first storage controller has at least one or more logical units. For example, this logical unit is LUN (Logical Unit Number). The logical unit is provided to the host device as a memory area. The host device can write data to the logical unit and can read the data from the logical unit, etc. The intermediate memory hierarchy is arranged in a lower layer of the logical unit. This intermediate memory hierarchy connects the logical unit and the memory device. The access from the host device is transmitted to the memory device from the logical unit through the intermediate memory hierarchy. Plural logical units and plural intermediate memory hierarchies can be respectively arranged. At least one intermediate memory hierarchy is connected to the memory device (can be also called an external memory device or a second memory device) of the second storage controller.

Namely, the memory device of the second storage controller is connected to the logical unit through the intermediate memory hierarchy, and is connected to the host device through the logical unit. Accordingly, similar to the utilization of the memory device of the first storage controller, the host device can utilize the memory device of the second storage controller without any consciousness. Further, for example, when the function of RAID, etc. is realized in the intermediate memory hierarchy, the function of the first storage controller is added to the memory device of the second storage controller and can be provided to the host device.

The memory area of the second storage controller can be theoretically directly connected to the logical unit. However, when the logical unit and the memory area of the second storage controller are directly connected to each other without interposing the intermediate memory hierarchy, it is restricted by the function and the performance of the second storage controller. Therefore, it is difficult to change the construction (RAID, division, expansion, etc.) of the memory area and add the function, etc. In contrast to this, the memory device of the second storage controller is reformed into a new memory resource and can be provided to the host device independently of the function and the performance of the second storage controller by indirectly connecting the memory device of the second storage controller to the logical unit through the intermediate memory hierarchy. For example, the memory device of each of plural second storage controllers can be summarized into one intermediate memory hierarchy, and the memory device of one second storage controller can be divided into plural intermediate memory hierarchies, etc.

The memory control device according to a separate viewpoint of the present invention is a memory control device communicably connected to a host device and a second storage controller and performing data processing according to a request from the host device, and comprising at least one or more logical units accessed by the host device; and at least one or more intermediate memory hierarchies arranged so as to connect the logical unit and at least one or more memory devices; wherein at least one of the intermediate memory hierarchies is connected to the memory device arranged in the second storage controller.

In one mode of the present invention, the intermediate memory hierarchy is constructed by arranging at least one or more first memory hierarchies set on the memory device, and at least one or more second memory hierarchies set on this first memory hierarchy, and the memory device arranged in the second storage controller is mapped to the first memory hierarchy.

The intermediate memory hierarchy can be constructed by a double structure constructed by a first memory hierarchy located in the lower layer and a second memory hierarchy located in the upper layer. The first and second memory hierarchies are connected to each other. The memory device of the second storage controller is connected to the logical unit through the intermediate memory hierarchy and can be provided to the host device by mapping the memory device of the second storage controller to the first memory hierarchy. Here, for example, the memory device of the second storage controller can be mapped to the first memory hierarchy by introducing a mapping table in which identification information for discriminating the first memory hierarchy, information for discriminating the memory device of the second storage controller, the memory capacity and the device classification (disk device, tape device, etc.) of the memory device of the second storage controller, and path information (WWN (World Wide Name) and LUN) of the memory device of the second storage controller are correspondingly set.

In one mode of the present invention, the memory control device further comprises plural logical units able to be accessed from the host device through plural paths different from each other, and each of the logical units is connected to each of the intermediate memory hierarchies.

Thus, even when one path cannot be used by a fault, etc., it is possible to get access through the other path by connecting the plural logical units to the intermediate memory hierarchy. Accordingly, it is possible to utilize the memory resource provided by the memory device of the second storage controller connected to the intermediate memory hierarchy.

In one mode of the present invention, the memory control device further comprises path information obtaining means for obtaining path information to the memory device arranged in the second storage controller, and each path information is recognized as path information to the same memory device when the obtained path information exists in the plural.

There is a case in which the memory device of the second storage controller has plural paths. For example, this case is a case in which an alternating path structure able to get access to the same logical volume from plural LUNs is arranged. In this case, the path information obtaining means obtains internal path information to the memory device of the second storage controller, i.e., path information able to be conscious of the alternating path structure. Thus, it is also possible to utilize the alternating path structure arranged in the memory device of the second storage controller.

The control method according to another viewpoint of the present invention is a control method of a memory control device communicably connected to a host device and a second storage controller and performing data processing according to a request from the host device, and including a step for obtaining path information to a memory device arranged in the second storage controller; and a step for mapping the obtained path information to an intermediate memory hierarchy connected to a logical unit accessed by the host device.

The computer program according to still another viewpoint of the present invention is a computer program for setting a memory device arranged in a second storage controller to a memory control device as an internal volume, and making the computer execute a step for obtaining path information to the memory device arranged in the second storage controller; and a step for mapping the obtained path information to an intermediate memory hierarchy connected to a logical unit accessed by the host device.

The embodiment modes of the present invention will next be explained on the basis of FIGS. 1 to 9.

In the present invention, as described below in detail, the external memory device can be provided to the host device as a self internal volume by mapping the memory device existing in the exterior to a self virtual device (VDEV).

1. FIRST EMBODIMENT

Figure 1:
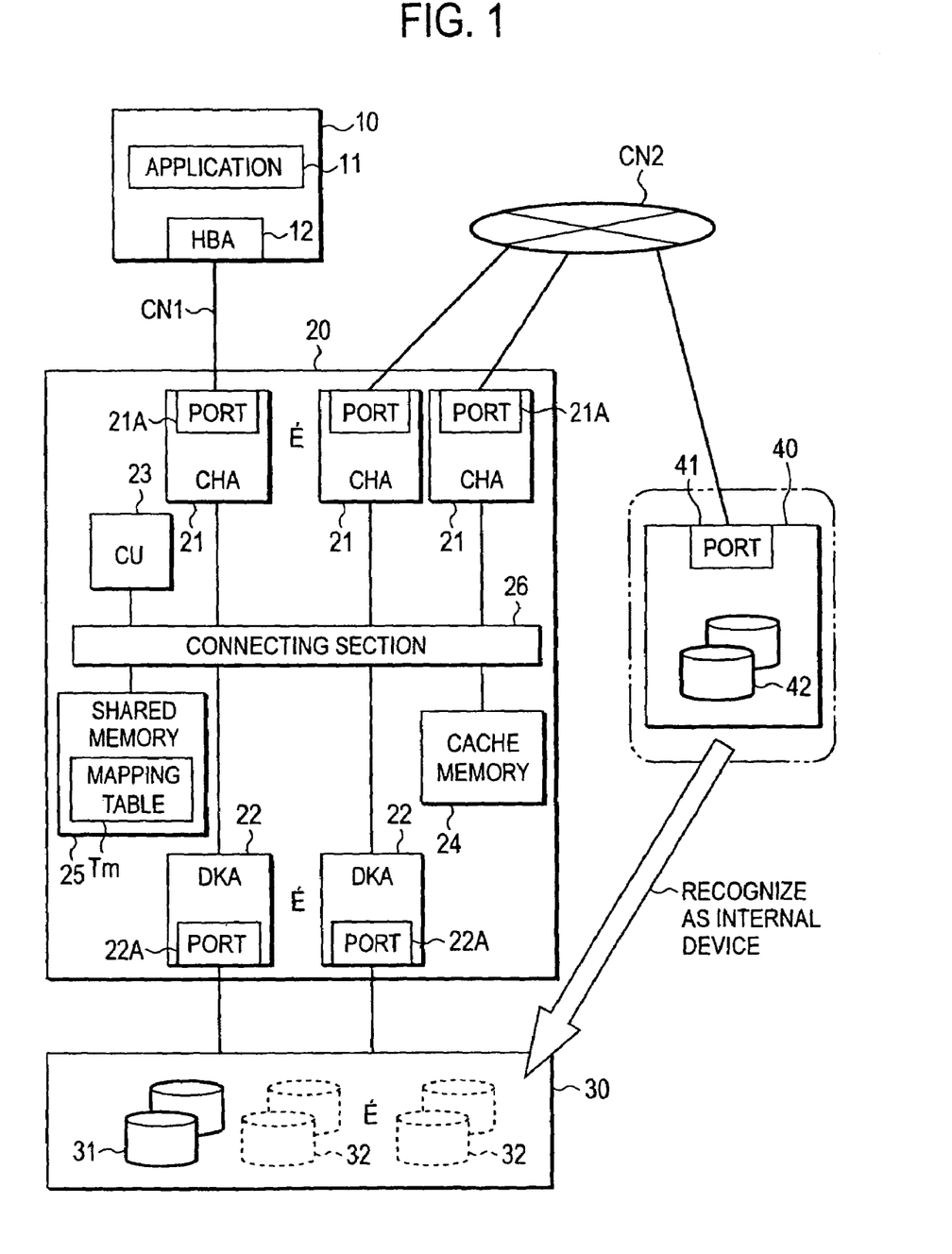
FIG. 1 is a block diagram showing the entire construction of a storage system in accordance with an embodiment of the present invention.

FIG. 1 is a block diagram showing the construction of a main portion of a storage system in this embodiment.

For example, a host device 10 is a computer device having information processing resources such as a CPU (Central Processing Unit), a memory, etc., and is constructed as a personal computer, a work station, a main frame, etc. For example, the host device 10 has an unillustrated information input device such as a keyboard switch, a pointing device, a microphone, etc., and an unillustrated information output device such as a monitor display, a speaker, etc. For example, an application program 11 such as database software, etc. using a memory area provided by a first storage controller 20, and an adapter 12 for getting access to the first storage controller 20 through a communication network CN1 are arranged in the host device 10.

The host device 10 is connected to the first storage controller 20 through the communication network CN1. For example, LAN, SAN, the Internet, a dedicated line, a public line, etc. can be suitably used as the communication network CN1 in accordance with cases. For example, data communication through the LAN is performed in accordance with TCP/IP (Transmission Control Protocol/Internet Protocol). When the host device 10 is connected to the first storage controller 20 through the LAN, the host device 10 assigns a file name and requires data input and output in a file unit. In contrast to this, when the host device 10 is connected to the first storage controller 20, etc. through the SAN, the host device 10 requires the data input and output in accordance with a fiber channel protocol by setting a block as a data managing unit of a memory area provided by plural disk memory devices (disk drives) to a unit. When the communication network CN1 is the LAN, the adapter 12 is e.g., a network card corresponding to the LAN. When the communication network CN1 is the SAN, the adapter 12 is e.g., a host bus adapter.

In FIG. 1, the host device 10 is connected to only the first storage controller 20 through the communication network CN1, but the host device 10 and a second storage controller 40 may be also connected through a communication network CN2. For example, the second communication network CN2 can be constructed from SAN, LAN, the Internet, a dedicated line, a public line, etc.

For example, the first storage controller 20 is constructed as a disk array subsystem. However, the first storage controller 20 is not limited to this disk array subsystem, but can be also constructed as e.g., a fiber channel switch of an intelligent type raised in function. As described later, the first storage controller 20 provides memory resources of the second storage controller 40 to the host device 10 as a self logical volume (logical unit). Accordingly, it is not necessary for the first storage controller 20 to have a local memory device directly controlled by this first storage controller 20 itself.

The first storage controller 20 can be generally divided into a controller section and a memory device section. For example, the controller section has plural channel adapters (hereinafter called CHA) 21, plural disk adapters (hereinafter called DKA) 22, a control unit (CU) 23, a cache memory 24, a shared memory 25 and a connecting section 26.

Each CHA 21 performs data communication with the host device 10. Each CHA 21 has a communication port 21A for communicating with the host device 10. Further, each CHA 21 is constructed as a micro computer system having a CPU, a memory, etc., and interprets and executes various kinds of commands received from the host device 10. A network address (e.g., IP address, WWN) for identifying each CHA 21 is allocated to each CHA 21, and each CHA 21 can individually behave as NAS (Network Attached Storage). When plural host devices 10 exist, each CHA 21 can individually receive a request from each host device 10.

Each DKA 22 transmits and receives data between each DKA 22 and memory devices 31, 32 of a memory device 30. Each DKA 22 has a communication port 22A for connecting each DKA 22 to the memory devices 31, 32. Each DKA 22 is constructed as a micro computer system having a CPU, a memory, etc. Each DKA 22 writes data received from the host device 10 by the CHA 21 to predetermined addresses of the predetermined memory devices 31, 32 on the basis of a request (write command) from the host device 10. Each DKA 22 also reads the data from the predetermined addresses of the predetermined memory devices 31, 32 on the basis of a request (read command) from the host device 10, and transmits the read data to the host device 10. When data are inputted and outputted between each DKA 22 and the memory devices 31, 32, each DKA 22 converts a logical address into a physical address. Each DKA 22 gets data access according to a RAID construction when the memory devices 31, 32 are managed in accordance with the RAID.

The control unit 23 controls the operation of the entire device. For example, an unillustrated console for management is connected to the control unit 23. The control unit 23 monitors the generation of a fault within the device and makes the console display the fault, and gives the instructions of blocking processing of a memory disk, etc. on the basis of commands from the console.

The cache memory 24 temporarily stores data received from the host device 10 and data read from the memory devices 31, 32. Control information, etc. are stored to the shared memory 25. A work area is set in the shared memory 25, and various kinds of table groups such as a mapping table Tm, etc. described later are also stored to the shared memory 25. One or plural memory devices 31, 32 may be also used as a disk for cache.

The connecting section 26 mutually connects each CHA 21, each DKA 22, the control unit 23, the cache memory 24 and the shared memory 25. For example, the connecting section 26 can be constructed as a high speed bus such as a super high speed cross bus switch, etc. for transferring data by a high speed switching operation.

The memory device 30 has plural memory devices 31. For example, a device such as a hard disk, a flexible disk, a magnetic tape, a semiconductor memory, an optical disk, etc. can be used as the memory device 31. The memory device 32 shown by a dotted line within the memory device 30 shows a state in which a memory device 42 arranged in the second storage controller 40 is taken in on the first storage controller 20 side. Namely, in this embodiment, the memory device 42 existing in the exterior seen from the first storage controller 20 is recognized as an internal memory device of the first storage controller 20, and memory resources of the external memory device 42 are provided to the host device 10.

The second storage controller 40 has a communication port 41 and the memory device 42. In addition to this, the second storage controller 40 can have CHA, DKA, etc., but no detailed structure of the second storage controller 40 is features of the present invention. Accordingly, the explanation of this detailed structure is omitted here. The second storage controller 40 is connected to the first storage controller 20 through a communication network CN2. The memory device 42 of the second storage controller 40 is treated as an internal memory device of the first storage controller 20.

Figure 2:
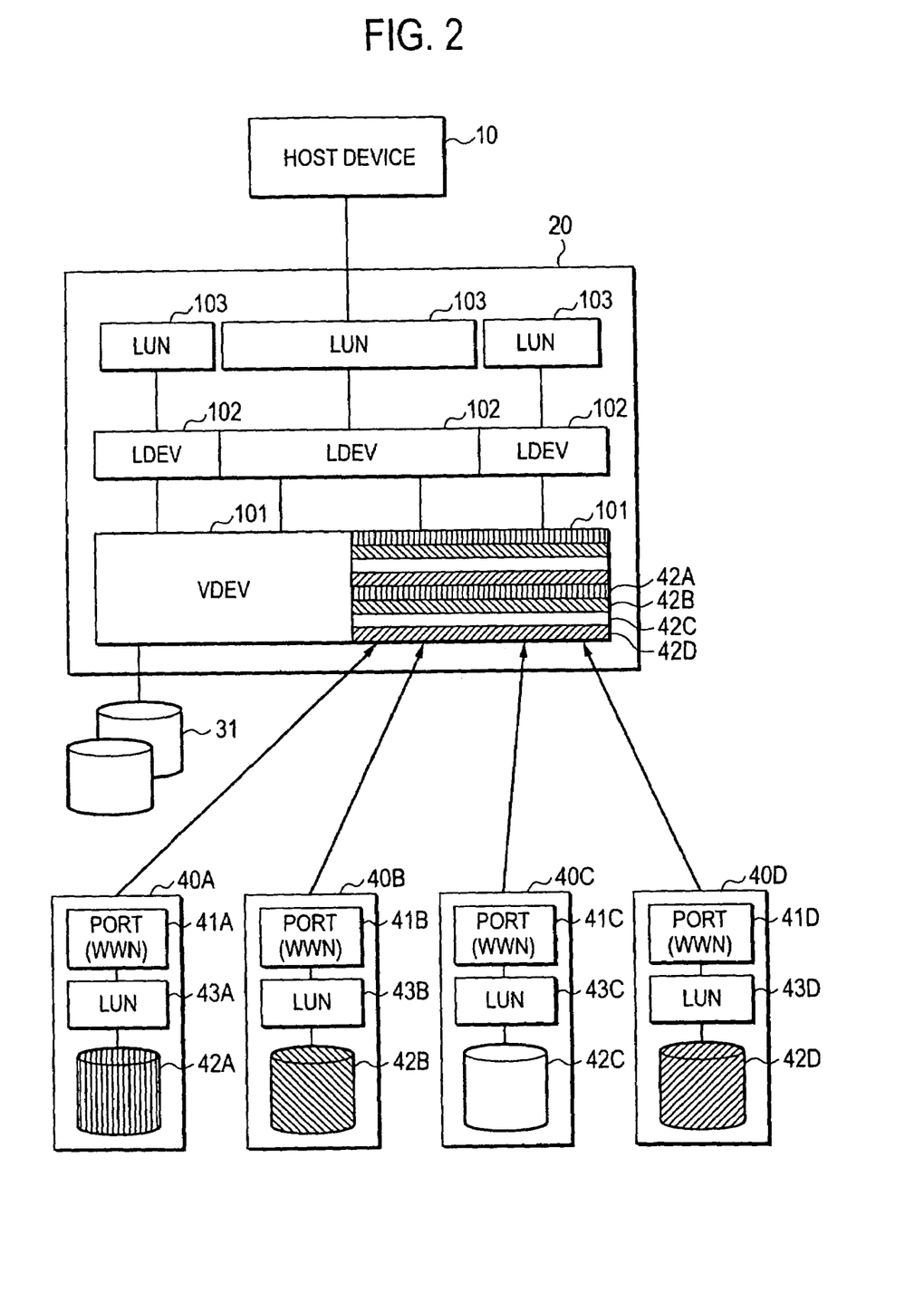
FIG. 2 is a typical view showing the summary of a logical construction of the storage system.

With reference to FIG. 2, FIG. 2 is a typical view showing one logical schematic structure of the first storage controller 20 and the memory device 32. As shown in FIG. 2, the first storage controller 20 has a memory hierarchy of three layers sequentially constructed by VDEV 101, LDEV 102 and LUN 103 from the lower layer side.

The VDEV 101 is a virtual device located in the lowermost position of the logical memory hierarchy. In the VDEV 101, physical memory resources are virtually set and the RAID construction can be applied. Namely, plural VDEVs 101 can be formed from one memory device 31 (slicing), and one VDEV 101 can be also formed from plural memory devices 31 (striping). For example, the memory device 31 is virtually set in accordance with a predetermined RAID construction in the VDEV 101 shown on the left-hand side of FIG. 2.

In contrast to this, the VDEV 101 shown on the right-hand side of FIG. 2 is constructed by mapping the memory device 42 of the second storage controller 40. Namely, in this embodiment, the logical volume (LDEV) provided by the memory device 42 of the second storage controller 40 can be used as an internal volume of the first storage controller 20 by mapping this logical volume to the VDEV 101 by using a mapping table Tm described later. In the example shown in FIG. 2, the VDEV 101 is constructed by striping four memory devices 42A to 42D. Each of the memory devices 42A to 42D can be individually accessed by specifying each of LUNs 43A to 43D from each of communication ports 41A to 41D. WWN as unique identification information is allocated to each of the communication ports 41A to 41D, and a LUN number is set to each of the LUNs 43A to 43D. Accordingly, the memory device can be specified by a combination of the WWN and the LUN number.

The LDEV 102 is set on the VDEV 101. The LDEV 102 is a logical device (logical volume) in which a virtual device (VDEV) is virtually set. It is possible to make connection from one VDEV 101 to two LDEVs 102 and also connection from plural VDEVs 101 to one LDEV 102. The LDEV 102 can be accessed through each LUN 103. Thus, in this embodiment, the external memory device 42 can be utilized as one of internal volumes of the first storage controller 20 by connecting the memory device 42 to an intermediate memory hierarchy (VDEV 101, LDEV 102) located between the LUN 103 and the memory device 42.

Figure 3:
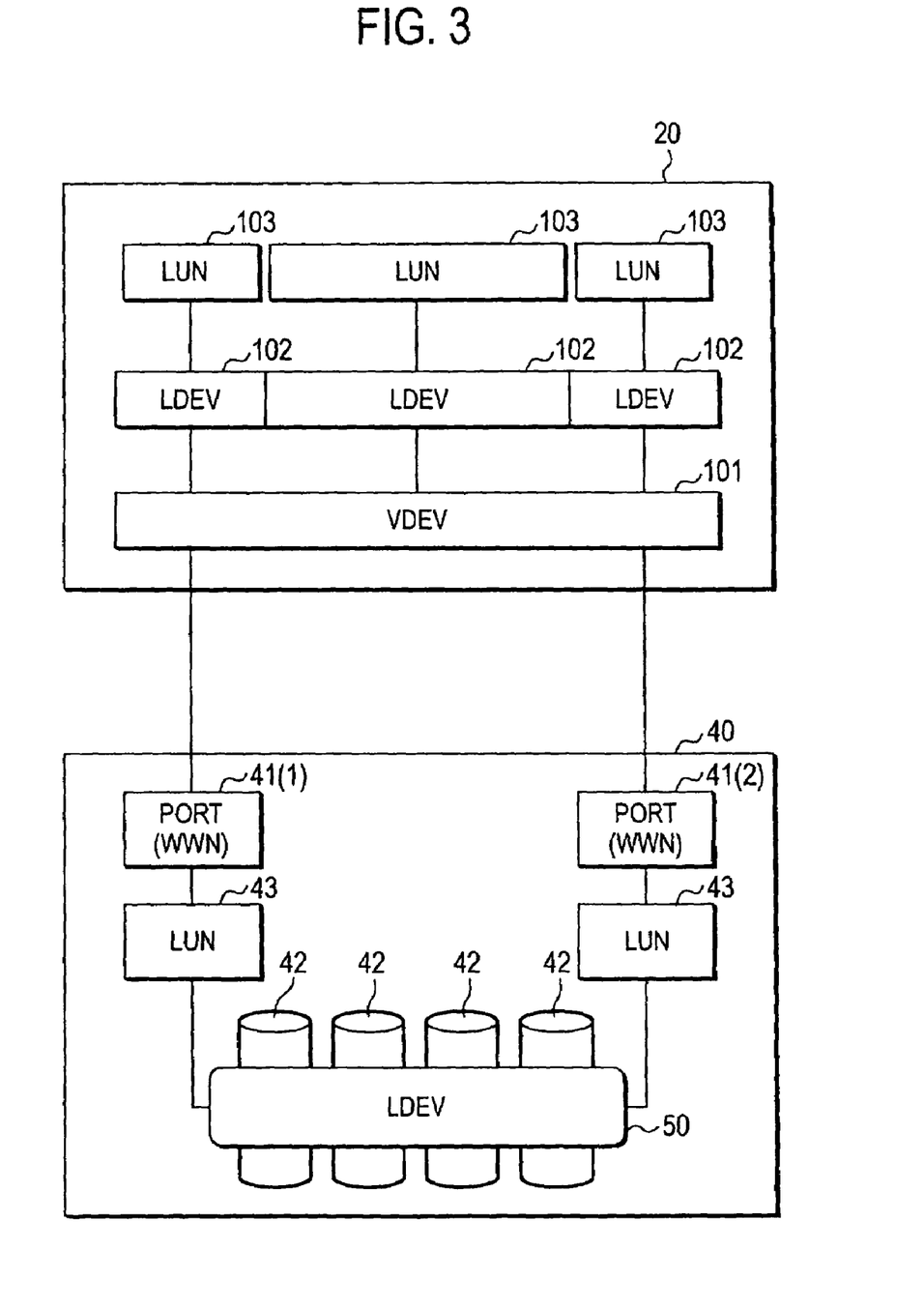
FIG. 3 is a typical view showing the summary of another logical construction.

FIG. 3 is a typical view showing another logical schematic structure. In FIG. 3, LDEV 50 provided by the memory device 42 of the second storage controller 40 has an alternating path construction having plural paths. Namely, the LDEV 50 as a logical volume is constructed on each memory device 42. This LDEV 50 can be accessed through each of two paths (access data paths). One path reaches the LDEV 50 from a first communication port 41(1) through the LUN 43, and the other path reaches the LDEV 50 from a second communication port 41(2) through another LUN 43. Accordingly, if one of the paths cannot be used by a fault, etc., the LDEV 50 can be accessed through the other path. When the LDEV 50 can be accessed from each of the plural paths, required data can be protected, etc. so as not to update data, etc. by getting access from the other path during the utilization of the data from one path.

In the example shown in FIG. 3, the first storage controller 20 utilizes the external LDEV 50 as the internal LDEV 102 by mapping the memory resource (LDEV 50) of the second storage controller 40 to the self VDEV 101. Further, plural LDEVs 102 are set onto one VDEV 101, and the external LDEV 50 is mapped to this VDEV 101 through the plural paths. The host device 10 recognizes only the LUN 103 (performs the recognition until the LDEV 102 as a result), and the structure below the LUN 103 is hidden with respect to the host device 10. The plural LDEVs 102 respectively utilize the same VDEV 101, and this VDEV 101 is connected to the same LDEV 50 through the plural paths. Accordingly, in the example shown in FIG. 3, redundancy of the first storage controller 20 can be raised by utilizing the alternating path structure arranged in the second storage controller 40.

Figure 4:
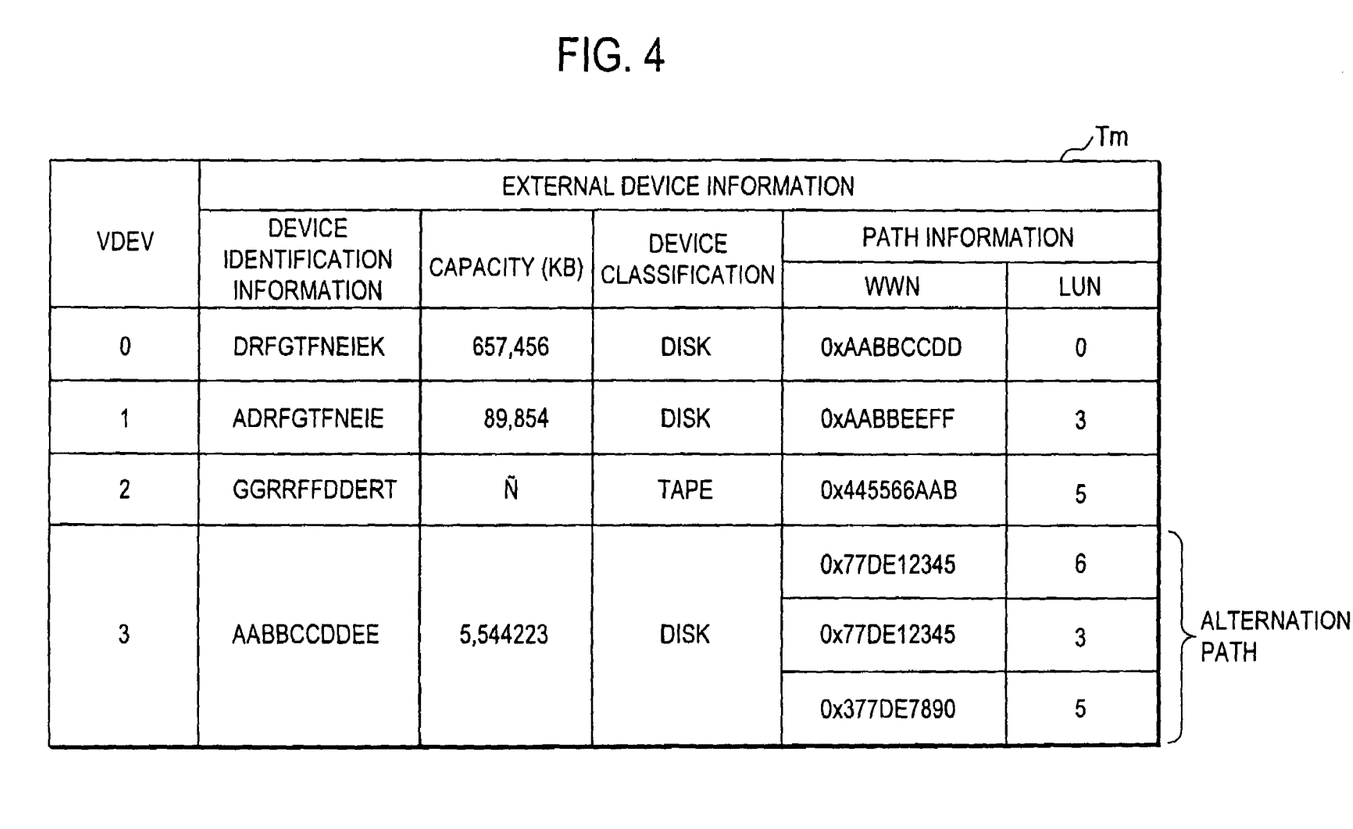
FIG. 4 is an explanatory view showing the summary of a mapping table.

Next, with reference to FIG. 4, FIG. 4 shows one example of a table structure for mapping the external memory device 42 (more specifically, the LDEV 50 provided by the external memory device 42) to the VDEV 101.

For example, the mapping table Tm can be constructed by correspondingly setting a VDEV number for discriminating each VDEV 101 and information of the external memory device 42. For example, the external device information can be constructed by including device identification information, the memory capacity of the memory device 42, information showing the classification of the device (e.g., a tape system device, a disk system device, etc.) and path information to the memory device 42. Further, the path information can be constructed by including identification information (WWN) proper to each communication port 41 and a LUN number for discriminating the LUN 43. The device identification information, the WWN, etc. shown within FIG. 4 are values for convenience of the explanation and particularly have no meaning. Three path information corresponds to the VDEV 101 of a VDEV number "3" shown on the lower side within FIG. 4. Namely, the alternating path structure having three paths is arranged within the external memory device 42 mapped to this VDEV 101 (#3), and the external memory device 42 is mapped to the VDEV 101 (#3) by recognizing this alternating path structure. It is cleared that the same memory area can be accessed by passing each of these three paths. Therefore, even when a fault, etc. are generated in one or two paths, predetermined desirable data can be accessed through the remaining normal paths.

One or plural external memory devices 42 can be mapped to one or more VDEVs 101 within the first storage controller 20 by adopting the mapping table Tm as shown in FIG. 4.

Figure 5:
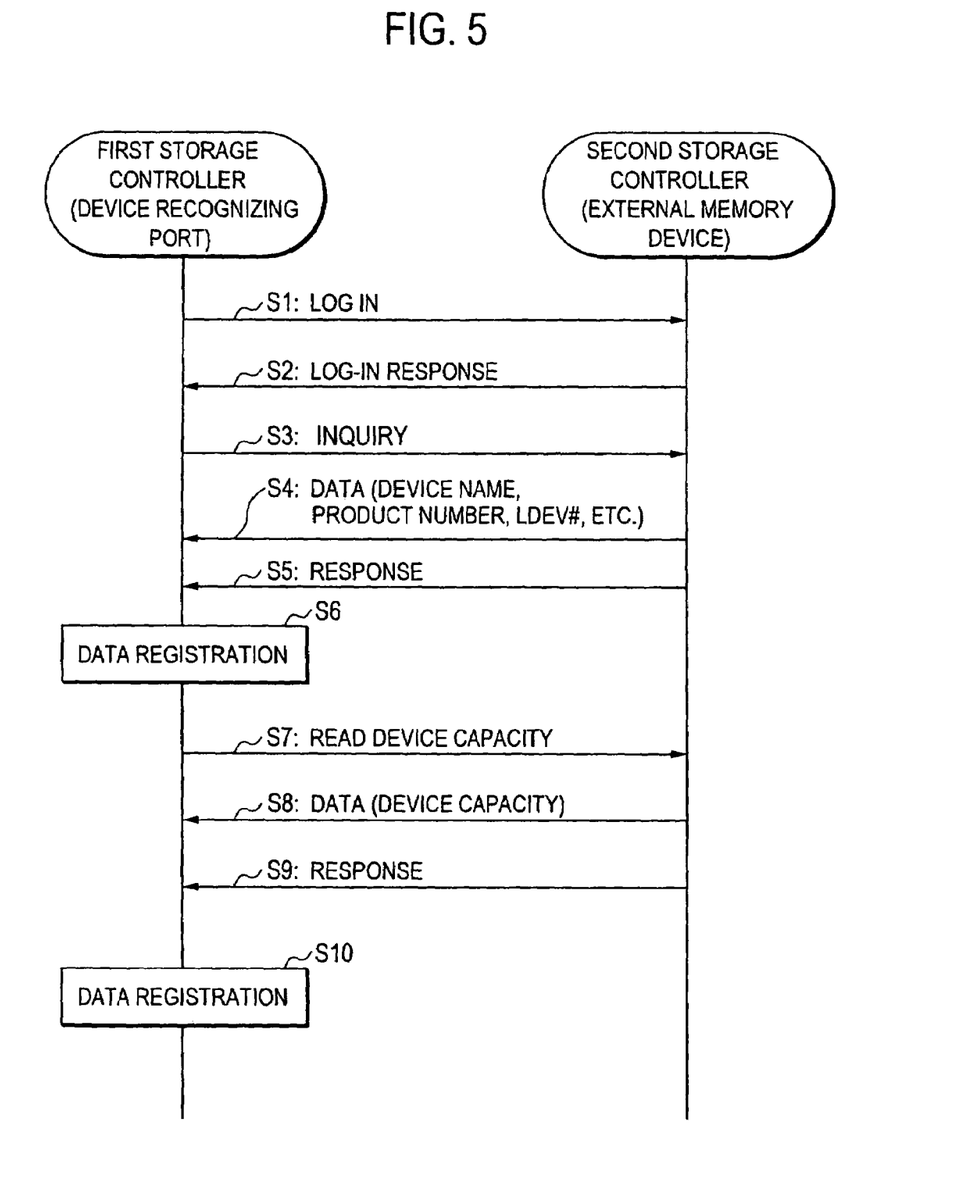
FIG. 5 is an explanatory view showing a flow of processing for constructing the mapping table.

One example of a method for mapping the external memory device 42 to the VDEV 101 will next be explained with reference to FIG. 5. FIG. 5 is a time chart showing a main portion of processing performed between the first storage controller 20 and the second storage controller 40 at the mapping time.

First, the first storage controller 20 logs-in the second storage controller 40 through an initiator port (21A) of the CHA 21 (S1). The second storage controller 40 makes a reply to the login of the first storage controller 20 so that the login is completed (S2). Next, for example, the first storage controller 20 transmits an inquiry command determined by SCSI (Small Computer System Interface) standard to the second storage controller 40, and requires a reply with respect to the details of the memory device 42 arranged in the second storage controller 40 (S3).

The inquiry command is used to clarify the kind and the construction of a device at an inquiry destination, and its physical structure can be gripped by transmitting the hierarchy arranged in the inquiry destination device. For example, the first storage controller 20 can obtain information such as a device name, a device type, a manufacture number (product ID), an LDEV number, each of various kinds of version information, a vendor ID, etc. from the second storage controller 40 by using the inquiry command (S4). The second storage controller 40 transmits the inquired information to the first storage controller 20, and makes a reply (S5).

The first storage controller 20 registers the information obtained from the second storage controller 40 to a predetermined place of the mapping table Tm (S6). Next, the first storage controller 20 reads the memory capacity of the memory device 42 from the second storage controller 40 (S7). The second storage controller 40 sends the memory capacity of the memory device 42 with respect to the inquiry from the first storage controller 20 (S8), and makes the reply (S9). The first storage controller 20 registers the memory capacity of the memory device 42 to a predetermined place of the mapping table Tm (S10).

The mapping table Tm can be constructed by performing the above processings. When data are inputted and outputted between the first storage controller 20 and the external memory device 42 (external LUN, i.e., external LDEV 50) mapped to the VDEV 101 of the first storage controller 20, address conversion, etc. are performed with reference to another table described later.

The data input and output between the first storage controller 20 and the second storage controller 40 will be explained with reference to FIGS. 6 to 8. A writing case of data will first be explained on the basis of FIGS. 6 and 7. FIG. 6 is a typical view showing processing at the data writing time. FIG. 7 is an explanatory view showing a processing flow within FIG. 6 in relation to each of various kinds of tables.

The host device 10 can write data to the logical volume (LDEV 102) provided by the first storage controller 20. For example, the host device 10 can be set so as to get access to only the specific LDEV 102 by the techniques of zoning for setting a virtual SAN subnet into SAN, and LUN masking for holding a list of accessible LUNs by the host device 10.

When the LDEV 102 intended to write data by the host device 10 is connected to the memory device 31 as an internal memory device through the VDEV 101, the data are written by normal processing. Namely, the data from the host device 10 are once stored to the cache memory 24, and are stored to a predetermined address of the predetermined memory device 31 from the cache memory 24 through the DKA 22. In this case, the DKA 22 converts the logical address into a physical address. Further, in the case of the RAID construction, the same data are stored to plural memory devices 31, etc.

Figure 6A:
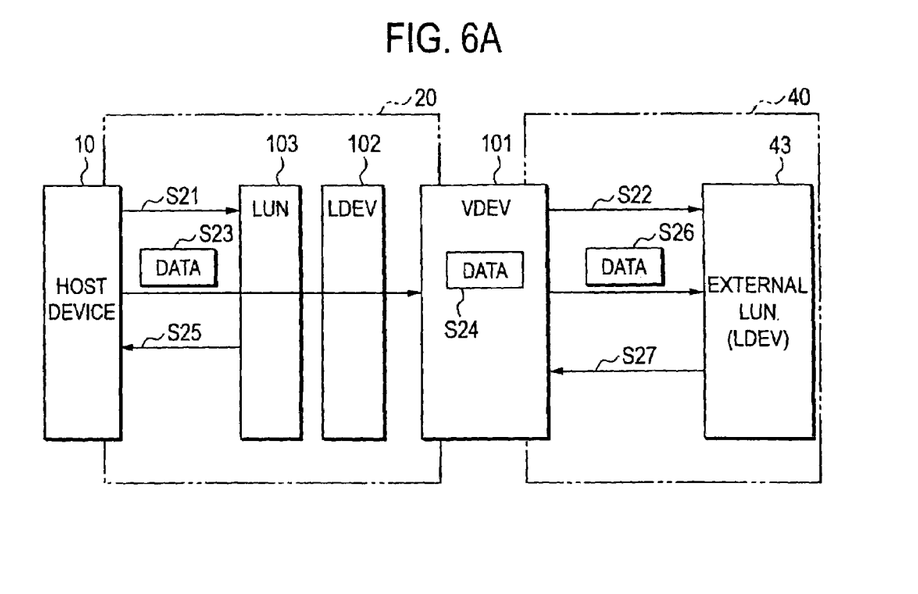
FIG. 6 is a conceptual view when data are written to an external memory device virtually set as an internal volume.
Figure 6B:
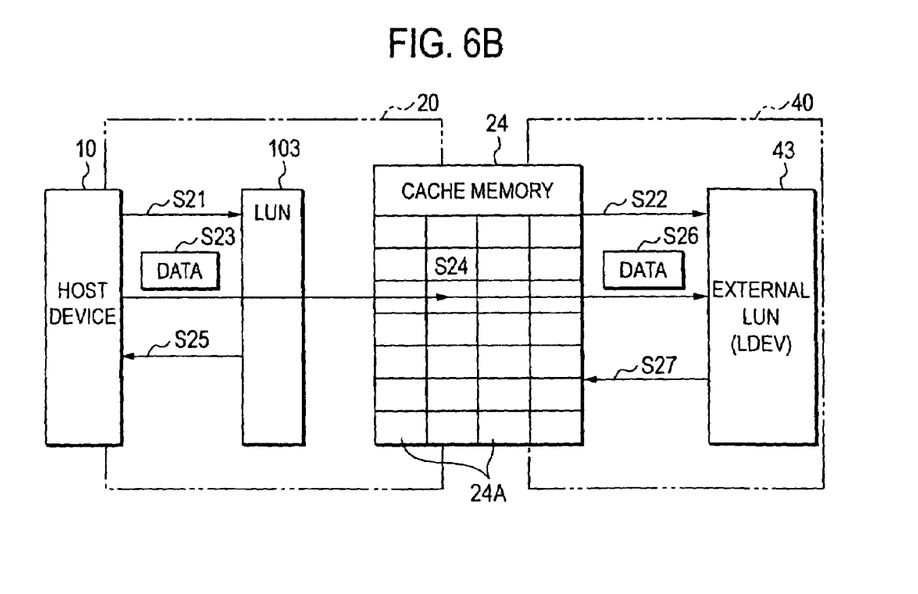

In contrast to this, when the LDEV 102 intended to be written by the host device 10 is connected to the external memory device 42 through the VDEV 101, the data are written by the flow shown in FIG. 6. FIG. 6A is a flow chart showing a memory hierarchy as a center. FIG. 6B is a flow chart showing a using method of the cache memory 24 as a center.

The host device 10 issues a write command by clarifying an LDEV number for specifying the LDEV 102 at a writing destination, and WWN for specifying the communication port 21A forgetting access to this LDEV 102 (S21). When the first storage controller 20 receives the write command from the host device 10, the first storage controller 20 generates a write command for transmission to the second storage controller 40, and transmits this write command to the second storage controller 40 (S22). The first storage controller 20 generates a new write command by changing write destination address information, etc. within the write command received from the host device 10 in conformity with the external LDEV 50.

Next, the host device 10 transmits data to be written to the first storage controller 20 (S23). The data received by the first storage controller 20 are transferred (S26) to the external LDEV 50 from the LDEV 102 through the VDEV 101 (S24). Here, the first storage controller 20 sends a reply (Good) of the writing completion to the host device 10 when the first storage controller 20 stores the data from the host device 10 to the cache memory 24 (S25). The second storage controller 40 transmits a writing completion report to the first storage controller 20 when the second storage controller 40 receives the data from the first storage controller 20 (or when the second storage controller 40 completely writes the data to the memory device 42) (S26). Namely, a period (S25) for reporting the writing completion to the host device 10 by the first storage controller 20, and a period for actually storing the data to the memory device 42 are different from each other (asynchronous system). Accordingly, the host device 10 is released from the data writing processing before the data are actually stored to the memory device 42, and can perform another processing.

With reference to FIG. 6B, many subblocks 24A are arranged in the cache memory 24. The first storage controller 20 converts a logical block address assigned from the host device 10 into the address of a subblock, and stores data to a predetermined place of the cache memory 24 (S24).

Figure 7A:
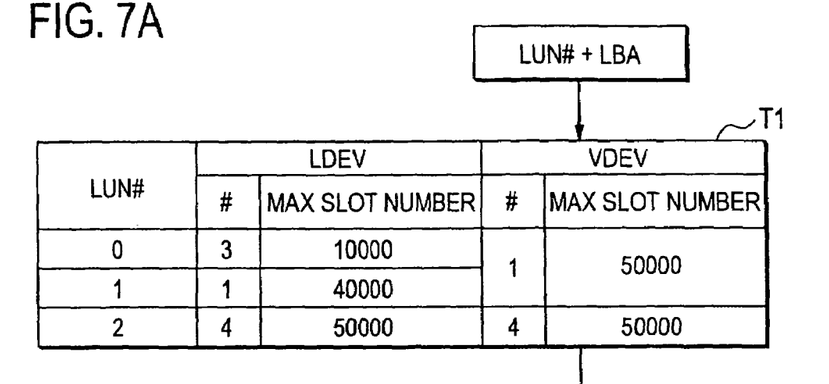
FIG. 7 is an explanatory view typically showing the situation of address conversion of the writing data.

A converting situation of data using each of various kinds of tables will be explained with reference to FIG. 7. As shown in the upper portion of FIG. 7, the host device 10 assigns a LUN number (LUN#) and a logical block address (LBA) and transmits data to the predetermined communication port 21A. The first storage controller 20 converts data (LUN#+LBA) inputted for the LDEV 102 into data for the VDEV 101 on the basis of a first conversion table T1 shown in FIG. 7A. The first conversion table T1 is a LUN-LDEV-VDEV conversion table for converting data for assigning the internal LUN 103 into data for the VDEV 101. For example, this table T1 is constructed by correspondingly setting the LUN number (LUN#), the number (LDEV#) and a maximum slot number of the LDEV 102 corresponding to this LUN 103, and the number (VDEV#) and a maximum slot number of the VDEV 101 corresponding to the LDEV 102, etc. The data (LUN#+LBA) from the host device 10 are converted into data (VDEV#+SLOT#+SUBBLOCK#) for the VDEV 101 by referring to this table T1.

Figure 7B:
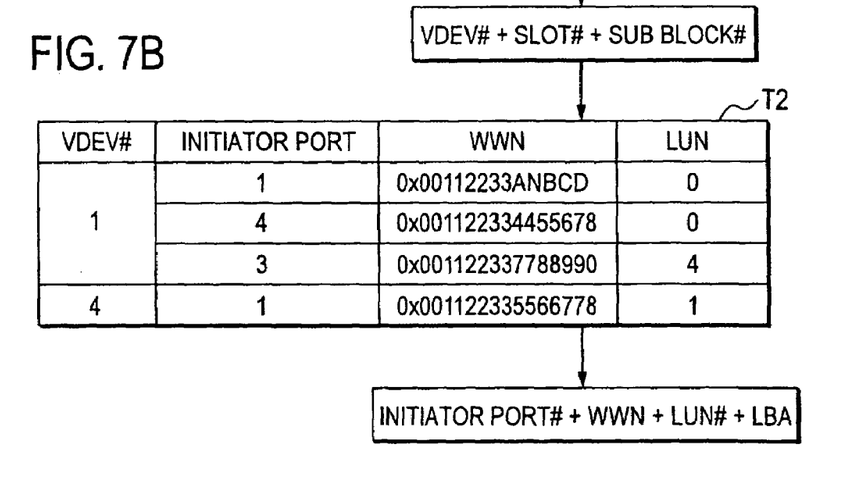

Next, the first storage controller 20 converts the data for the VDEV 101 into data transmitted and stored for the external LUN (LDEV 50) of the second storage controller 40 with reference to a second conversion table T2 shown in FIG. 7B. In the second conversion table T2, for example, the number (VDEV#) of the VDEV 101, the number of an initiator port for transmitting these data from the VDEV 101 to the second storage controller 40, WWN for specifying the communication port 41 at a data transfer destination, and the LUN number able to be accessed through this communication port are correspondingly set. The first storage controller 20 converts address information of data to be stored into the format of an initiator port number #+WWN+LUN#+LBA on the basis of this second conversion table T2. The data changed in the address information in this way are transmitted to the assigned communication port 41 from the assigned initiator port through the communication network CN2. These data are then stored to a predetermined place of the LDEV 50 able to be accessed by the assigned LUN 43. Since the LDEV 50 is virtually constructed in plural memory devices 42, the address of the data is converted into a physical address and is stored to a predetermined address of a predetermined disk.

Figure 7C:
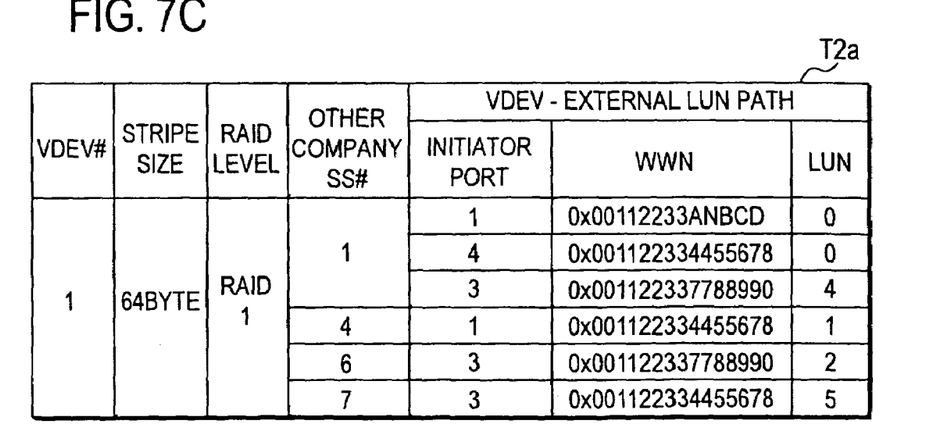

FIG. 7C shows another second conversion table T2a. This conversion table T2a is used when a stripe and RAID are applied to the VDEV 101 originated in the external memory device 42. The conversion table T2a is constructed by correspondingly setting a VDEV number (VDEV#), a stripe size, a RAID level, a number (SS# (storage system number)) for discriminating the second storage controller 40, an initiator port number, the WWN of the communication port 41, and the number of the LUN 43. In the example shown in FIG. 7C, RAID1 is constructed by utilizing four external storage controllers in total specified by SS#(1, 4, 6, 7) in one VDEV 101. Three LUNs (#0, #0, #4) allocated to SS#1 are set in the same device (LDEV#). The volume of LUN#0 has an alternating path structure having two access datapaths. Thus, in this embodiment, the functions of striping, RAID, etc. can be added and thereafter provided to the host device 10 by constructing the VDEV 101 from plural logical volumes (LDEV) existing in the exterior.

The flow of a reading case of data from the LDEV 50 of the second storage controller 40 will be explained with reference to FIG. 8.

First, the host device 10 assigns the communication port 21A and transmits a reading command of data to the first storage controller 20 (S31). When the first storage controller 20 receives the reading command, the first storage controller 20 generates a reading command so as to read required data from the second storage controller 40. The first storage controller 20 then transmits the generated reading command to the second storage controller 40 (S32). The second storage controller 40 reads the required data from the memory device 42 in accordance with the reading command received from the first storage controller 20, and transmits the required data to the first storage controller 20 (S33), and reports that the reading is normally completed (S35). As shown in FIG. 8B, the first storage controller 20 stores the data received from the second storage controller 40 to a predetermined place of the cache memory 24 (S34).

The first storage controller 20 reads the data stored to the cache memory 24 and performs address conversion. Thereafter, the first storage controller 20 transmits the data to the host device 10 through the LUN 103, etc. (S36), and reports the reading completion (S37). In a series of processings at the reading time of these data, the conversion operation described together with FIG. 7 is performed in the reverse direction.

Figure 8A:
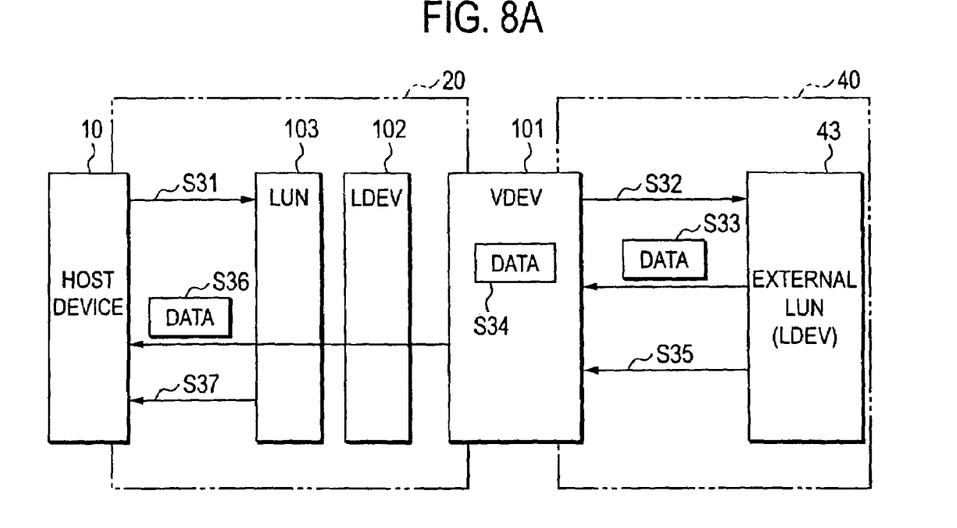
FIG. 8 is a conceptual view when the data are read from the external memory device virtually set as the internal volume.
Figure 8B:
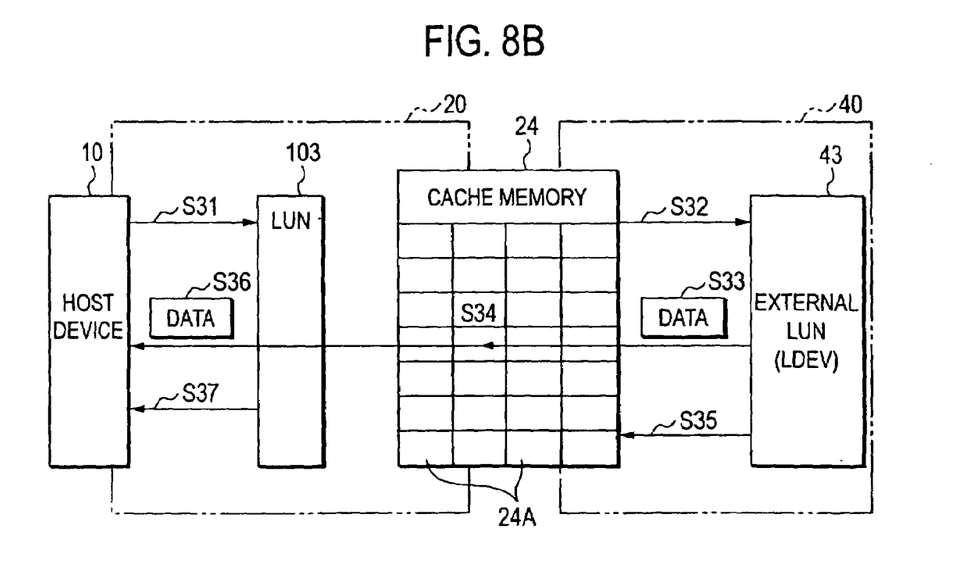

FIG. 8 shows data as if these data are read from the second storage controller 40 and are stored to the cache memory 24 in accordance with a request from the host device 10. However, the present invention is not limited to this construction, all or one portion of data stored to the external LDEV 50 can be also stored to the cache memory 24 in advance. In this case, the data can be immediately read from the cache memory 24 and can be transmitted to the host device 10 with respect to the reading command from the host device 10.

As described above in detail, in accordance with this embodiment, the external logical volume can be treated as if the external logical volume is an internal logical volume, or the external memory device 42 can be treated as if the external memory device 42 is a virtual internal memory device in order to construct the external memory device 42 (exactly, external LDEV 50) so as to be mapped to the VDEV 101. Accordingly, even when the second storage controller 40 is a device of an old type unable to be directly connected to the host device 10, the memory resource of the old type device can be reutilized as the memory resource of the first storage controller 20 and can be provided to the host device 10 by interposing the first storage controller 20 of a new type. Thus, the storage controller of the old type can be integrated with the storage controller 20 of the new type and the memory resource can be effectively utilized.

Further, when the first storage controller 20 is a new type device of high performance and high function, the low performance of the second storage controller 40 can be hidden by the computer resource of high performance (cache capacity, CPU processing speed, etc.) arranged in the first storage controller 20. Thus, the service of high performance can be provided to the host device 10 by using the virtual internal volume practically using the external memory device 42.

Further, for example, the functions of striping, expansion, division, RAID, etc. can be added and used in the LDEV 50 constructed in the external memory device 42. Accordingly, the degree of freedom of utilization is raised and using convenience is improved in comparison with a case in which the external volume is directly mapped to the LUN 103.

Further, since the external logical volume can be used as if the external logical volume is the internal logical volume, various functions able to be utilized by the first storage controller 20 with respect to the LDEV 102 as the normal internal volume can be also applied to the virtual internal volume (LDEV connected to the LDEV 50). For example, MRCF, a remote copy, CVS, LUSE, etc. can be used as the various functions able to be utilized. Here, the MRCF (Multiple RAID Coupling Feature) is a function able to make a replica of the logical volume without transmitting data via the host device 10 (host free). The remote copy is a function for synchronizing the memory contents of a primary volume arranged in a local site and a secondary volume arranged in a remote site. The CVS (Customizable Volume Size) is a variable volume function able to set the size of the logical volume to an arbitrary size except for a standard size. The LUSE (LU Size Expansion) is a LUN size expansion function for integrating plural logical volumes into one logical volume and reducing the number of LUNs recognizable from the host device 10.

Further, since the VDEV 101 constructed from the external logical volume can be connected to each of plural LDEVs 102, the alternating path structure can be obtained by connecting the host device 10 to the LUN 103 of each LDEV 102, and a load balancing effect can be also obtained.

Since the mapping to the VDEV 101 is performed by performing gripping until the alternating path structure arranged in the second storage controller 40 by the inquiry command, the alternating path structure arranged in the second storage controller 40 can be also taken over and redundancy of the storage system can be raised.

In contrast to this, in the prior art described in the column of the background art, the local memory device, i.e., the volume of the memory device directly placed under control of the storage controller is simply reconstructed in a sector unit, and no external memory device is treated as the virtual internal memory device as in this embodiment. Further, another prior art is a technique for optimizing the size of an area in conformity with the memory capacity of the local memory device, and is not a technique able to utilize the external memory device 42 as the virtual internal memory device as in this embodiment.

2. SECOND EMBODIMENT

The second embodiment of the present invention will next be explained with reference to FIG. 9. The features of this embodiment are that the alternating path structure arranged in the second storage controller 40 is verified.

Figure 9:
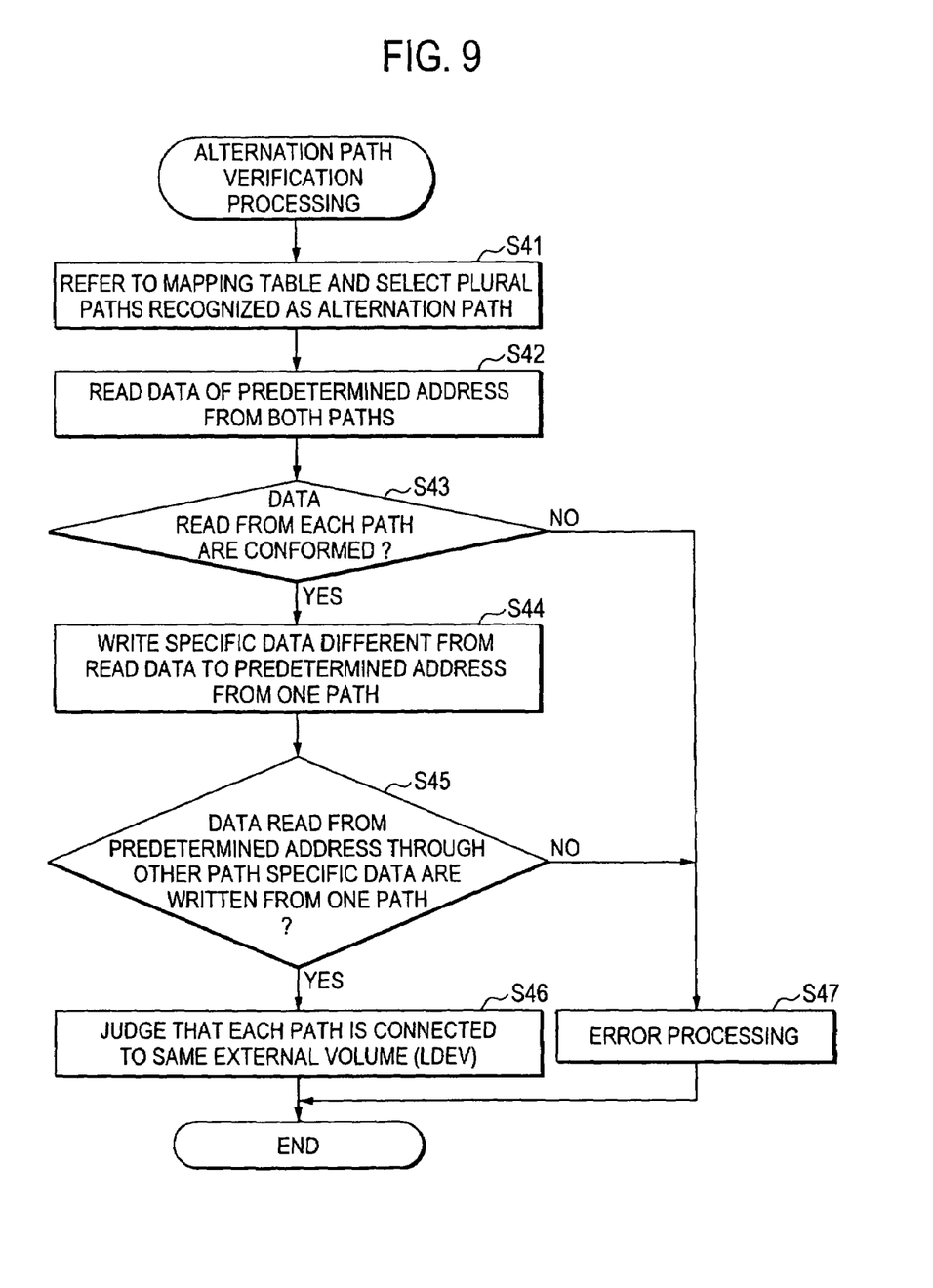
FIG. 9 is a flow chart showing processing for verifying an alternating path structure in accordance with another embodiment of the present invention.

FIG. 9 is a flowchart schematically showing verification processing of the alternating path structure executed by the first storage controller 20. The first storage controller 20 selects one set of access data paths (normally two access data paths) recognized as the alternating path by referring to the mapping table Tm (S41).

Next, the first storage controller 20 reads data from a predetermined address through each selected path (S42), and judges whether the data read from each path are conformed or not (S43). When the data read from both paths are conformed to each other (S43: YES), it is possible to tentatively judge that the alternating path structure is constructed. However, the possibility that each path is connected to a different volume and the same data are accidentally stored to each reading destination address, is also left.

Therefore, in this embodiment, specific data are written to a predetermined address through one path as conformation of a second stage (S44). These writing data are different from the data read in the step S42. Next, data are again read from a predetermined address through the other path, and it is judged whether these read data are conformed to the specific data written in the step S44 or not (S45). When both the data are conformed to each other (S45: YES), it is verified that the alternating path structure is constructed (S46).

When it is judged that the judgment is "NO" in the test (S43) of the first stage or the test of the second stage (S45), it is judged that the alternating path structure registered to the mapping table Tm is incorrect, and error processing is performed (S47). The mapping table Tm can be reconstructed, etc. as this error processing.

Thus, reliability can be improved since the processing for verifying the alternating path structure of the second storage controller 40 gripped by the inquiry command is arranged. Further, the reliability of the verification can be raised since the verification is performed at two stages constructed by the test of the first stage for judging whether the data read from each path are conformed or not, and the test of the second stage for writing data different from the read data and again reading data from each path and judging whether these data are conformed or not.

The present invention is not limited to each of the above embodiments. Persons skilled in the art can perform various additions, changes, etc. within the scope of the present invention. In each of the above embodiments, the disk array device is explained as a center, but the present invention is not limited to this disk array device. The present invention can be also applied to a fiber channel switch intelligently formed.

What is claimed is:

1. A system having a first controller of a virtualization system and a second controller of a disk array system, said second controller being coupled to said first controller, said system performing data processing according to a request from a host device, wherein said first controller conducts mapping such that relations between at least one first logical unit accessed by said host device and at least one intermediate logical device are set, wherein said intermediate logical device is related to a second logical unit of said second controller by a virtualization setting function of said first controller, wherein said first logical unit is related to a first logical unit number (LUN), wherein said second logical unit is related to a second LUN, wherein said first and second LUNs are different from each other and become related according to the mapping, and wherein said first controller obtains oath information indicating a path from said first LUN to said second LUN via said intermediate logical device, and recognizes a memory device as a same memory device if a plurality of paths from said first LUN to a plurality of said second logical units are connected to said memory device.

2. A system having a first controller of a virtualization system, and a second controller of a disk array system, said second controller being coupled to said first controller, said system performing data processing according to a request from a host device, said first controller comprising:

a memory having stored therein information which maps relations between at least one first logical unit accessed by said host device and at least one intermediate logical device, wherein said intermediate logical device is related to a second logical unit of said second controller by a virtualization setting function of said first controller, wherein said first logical unit is related to a first logical unit number (LUN), wherein said second logical unit is related to a second LUN, wherein said first and second LUNs are different from each other and become related according to mapping, and wherein said first controller obtains path information indicating a path from said first LUN to said second LUN via said intermediate logical device, and recognizes a memory device as a same memory device if a plurality of paths from said first LUN to a plurality of said second logical units are connected to said memory device.

3. The system according to claim 2, wherein said intermediate logical device is constructed by arranging at least one level of a first memory, and at least one level of a second memory hierarchically arranged at a level above the at least one level of first memory, and wherein a memory device in said second controller is mapped to the at least one level of first memory.

4. The system according to claim 2, wherein said first controller further comprises:

a plurality of logical units which can be accessed from said host device through plural paths different from each other, wherein each of said logical units is related to each of said at least one intermediate device.

5. A storage controller communicably connected to a host device and another storage controller and performing data processing according to a request from said host device, said storage controller comprising:

at least one logical unit accessed by said host device;

at least one intermediate memory hierarchy arranged to connect said at least one logical unit and at least one memory device;

wherein at least one of said at least one intermediate memory hierarchy is connected to the at least one memory device which is arranged in said another storage controller; and path information obtaining means for obtaining path information to said at least one memory device arranged in said another storage controller, wherein said path information is recognized as path information to the same memory device when said obtained path information exists in plural.

6. A control method of a system having a first controller of a virtualization system and a second controller of a disk array system, said second controller being coupled to said first controller, said control method performing data processing according to a request from a host device, comprising the steps of:

wherein said first controller conducts mapping such that relations between at least one first logical unit accessed by said host device and at least one intermediate logical device are set, wherein said intermediate logical device is related to a second logical unit of said second controller by a virtualization setting function of said first controller, wherein said first logical unit is related to a first logical unit number (LUN), and wherein said second logical unit is related to a second LUN, obtaining path information to a memory device arranged in said second controller; and mapping said obtained path information to said intermediate logical device connected to said at least one logical unit accessed by said host device, wherein said first and second LUNs are different from each other and become related according to the mapping, and wherein said first controller obtains path information indicating a path from said first LUN to said second LUN via said intermediate logical device, and recognizes a memory device as a same memory device if a plurality of paths from said first LUN to a plurality of said second logical units are connected to said memory device.

7. A computer program, stored on a storage medium, for performing data processing according to a request from a host device in a system having a first controller of a virtualization system and a second controller of a disk array system, said second controller being coupled to said first controller, said computer program when executed causes said system to perform the steps of:

wherein said first controller conducts mapping such that relations between at least one first logical unit accessed by said host device and at least one intermediate logical device are set, wherein said intermediate logical device is related to a second logical unit of said second controller by a virtualization setting function of said first controller, wherein said first logical unit is related to a first logical unit number (LUN), and wherein said second logical unit is related to a second LUN, obtaining path information to the memory device arranged in said second controller; and mapping said obtained path information to an intermediate logical device connected to said at least one logical unit accessed by said host device, wherein said first and second LUNs are different from each other and become related according to the mapping, and wherein said first controller obtains path information indicating a path from said first LUN to said second LUN via said intermediate logical device, and recognizes a memory device as a same memory device if a plurality of oaths from said first LUN to a plurality of said second logical units are connected to said memory device.

* * * * *